(12) United States Patent
Kiyama et al.

(10) Patent No.: US 9,663,737 B2
(45) Date of Patent: May 30, 2017

(54) SOLID FUEL

(76) Inventors: Michihiro Kiyama, Hiroshima (JP);
Masayuki Yamamoto, Tokyo (JP)

( * ) Notice: Subject to any disclaimer, the term of this patent is extended or adjusted under 35 U.S.C. 154(b) by 1022 days.

(21) Appl. No.: 13/822,505

(22) PCT Filed: Sep. 17, 2010
(Under 37 CFR 1.47)

(86) PCT No.: PCT/JP2010/066181
§ 371 (c)(1),
(2), (4) Date: Jun. 27, 2013

(87) PCT Pub. No.: WO2012/035649
PCT Pub. Date: Mar. 22, 2012

(65) Prior Publication Data
US 2014/0082997 A1    Mar. 27, 2014

(51) Int. Cl.
*C10L 5/00* (2006.01)
*C10L 5/44* (2006.01)
*C10L 5/40* (2006.01)
*C10L 5/14* (2006.01)
*C10L 5/36* (2006.01)

(52) U.S. Cl.
CPC .............. *C10L 5/442* (2013.01); *C10L 5/14* (2013.01); *C10L 5/363* (2013.01); *C10L 5/365* (2013.01); *C10L 5/40* (2013.01); *C10L 5/403* (2013.01); *C10L 5/445* (2013.01); *C10L 2200/0484* (2013.01); *C10L 2250/04* (2013.01); *Y02E 50/10* (2013.01); *Y02E 50/30* (2013.01)

(58) Field of Classification Search
CPC .............. C10L 2200/0469; C10L 5/363; C10L 2290/30; C10L 5/442
See application file for complete search history.

(56) References Cited

U.S. PATENT DOCUMENTS

| 4,326,854 A | 4/1982 | Tanner | |
|---|---|---|---|
| 2005/0011113 A1 | 1/2005 | Gomez | |
| 2008/0171297 A1* | 7/2008 | Reynolds | C10L 5/363 432/1 |
| 2009/0031619 A1 | 2/2009 | Maman et al. | |
| 2009/0205546 A1* | 8/2009 | Kluko | C10L 5/363 110/261 |
| 2010/0146850 A1* | 6/2010 | Bexell | C10L 5/363 44/589 |
| 2010/0300368 A1* | 12/2010 | Myers | A01K 1/0154 119/171 |
| 2011/0078947 A1 | 4/2011 | Kiyama | |
| 2013/0004904 A1 | 1/2013 | Kiyama | |
| 2013/0008358 A1 | 1/2013 | Kiyama | |

FOREIGN PATENT DOCUMENTS

| GB | WO 0179378 A1 * | 10/2001 | B01J 20/22 |
|---|---|---|---|
| JP | 57-57796 | 4/1982 | |
| JP | 61-28589 | 2/1986 | |
| JP | 62-43490 | 2/1987 | |
| JP | 7-82581 | 3/1995 | |
| JP | 2007-177027 | 7/2007 | |
| JP | 2010-65154 | 3/2010 | |
| JP | 2010-18725 | 12/2010 | |
| WO | WO 2011113039 A2 * | 9/2011 | C09K 17/40 |

OTHER PUBLICATIONS

U.S. Appl. No. 13/822,507 to Michihiro Kiyama et al., filed Mar. 12, 2013.
Search report from International Application No. PCT/JP2010/066181, mail date is Nov. 2, 2010.
Extended European Search Report in respect to European Application No. 10857283.5, dated May 16, 2014.

* cited by examiner

*Primary Examiner* — James Goloboy
*Assistant Examiner* — Ming Cheung Po
(74) *Attorney, Agent, or Firm* — Greenblum & Bernstein, P.L.C.

(57) ABSTRACT

To provide a solid fuel which uses waste wood, used paper, a binder, a form retaining agent and a caloric augmentation agent in a balanced manner, has a stable calorific value, and suppresses the production of carbon dioxide. A solid fuel which is formed from a mixture of wood pieces having a size of 1 to 50 mm, paper pieces having a size of 1 to 50 mm, a binder, a form retaining agent and a caloric augmentation agent, wherein the mixture contains the wood pieces and the paper/natural fiber pieces in a total amount of 15 to 45 parts by weight and the binder, the form retaining agent and the caloric augmentation agent in a total amount of 55 to 85 parts by weight, has a weight ratio of the wood pieces to the paper pieces of 20:80 to 80:20, and is molded.

10 Claims, No Drawings

SOLID FUEL

BACKGROUND OF THE INVENTION

Field of the Invention

The present invention relates to a solid fuel. More specifically, it relates to a solid fuel which makes effective use of waste wood, waste paper, a binder, a form retaining agent and a caloric augmentation agent. Much more specifically, it relates to a solid fuel which makes effective use of wood and paper wastes, a binder, a form retaining agent and a caloric augmentation agent, produces as small an amount as possible of a harmful gas or residue after combustion, has a large calorific value and leads to the suppression of the production of carbon dioxide, especially a solid fuel suitable for use as a fuel for power generation.

Prior Art

Along with the modernization of living, waste products such as wood waste, paper waste and plastics are produced in large quantities from domestic lives, production plants, processing plants, etc. and the disposal of these waste products is now a social problem. Most of these waste products are collected and burnt or buried in the ground. However, the proportion of waste products which are recycled into everyday goods or used as energy sources after they are collected is gradually increasing but still unsatisfactory. Especially parts of waste wood from old houses, thinned wood and used paper have been burnt because the collection and sorting of these waste products cost a great deal and the recycling of these is difficult. Along with the frequent occurrence of a wide-scale disaster which is seemed to be caused by the global warming phenomenon in recent years, each country is trying to suppress the production of carbon dioxide which is one of greenhouse effect gases but it can be said that this is still unsatisfactory. Then, solid fuels making use of wood waste, paper waste and plastic waste are used in power boilers as alternatives to oil and coal but it can be said that their effect of suppressing the production of carbon dioxide is still unsatisfactory.

Meanwhile, Patent Documents 1 to 3 propose the recycling of wood waste, paper waste and plastic waste into a solid fuel.

Patent Document 1 proposes a solid fuel which makes use of used paper and plastic waste. This solid fuel actually comprises 25 to 100 parts by weight of plastic waste based on 100 parts by weight of used paper. Thus, a relatively large amount of plastic waste (20 to 50 wt % of the total) is used. Although this Patent Document 1 teaches that a wood-based waste material may be further used, the amount of the wood-based waste material used in Examples is no more than 10 wt % of the total. The above solid fuel contains plastic waste in a relatively large proportion and therefore, the step of dechlorinating the obtained solid fuel by heating it is required to suppress a trouble caused by the inclusion of polyvinyl chloride at the time of combustion.

Patent Document 2 proposes a solid fuel obtained by pressure bonding together plastics, wood powders, bark and used paper and molding the obtained product into a pellet. Although the amount of the plastics contained in the solid fuel is specified as 10 to 80%, judging from FIGS. 2 to 4, the amount of the plastics is estimated at 30% or more, preferably 50% or more.

Patent Document 3 proposes a method of obtaining a fuel by kneading 5 to 10 parts by weight of a synthetic resin-based waste material with 100 parts by weight of a wood-based waste material and pelletizing the kneaded product. The pellet obtained by this method has a small diameter of about 6 to 12 mm, it cannot be said that the calorific value of the pellet is sufficiently large, and further, its form retention stability is unsatisfactory. Therefore, the pellet is unsuitable for use as a solid fuel for thermal power generation.

Meanwhile, along with the frequent occurrence of a wide-scale disaster which is seemed to be caused by the global warming phenomenon in recent years, each country is trying to suppress the production of carbon dioxide which is one of greenhouse effect gases but it can be said that this is still unsatisfactory. Then, solid fuels making use of wood waste, paper waste and plastic waste are used in power boilers as alternatives to oil and coal but it can be said that their effect of suppressing the production of carbon dioxide is still unsatisfactory.

That is, since plastics are used as a binder and a fuel in the solid fuels proposed by the above Patent Documents 1 to 3, considering that the plastics are produced from oil, these solid fuels are unsatisfactory in the effect of suppressing the production of carbon dioxide.

PRIOR ART DOCUMENTS

Patent Documents

Patent Document 1: JP-A 7-82581
Patent Document 2: JP-A 57-57796
Patent Document 3: JP-A 62-43490

SUMMARY OF THE INVENTION

Problem to be Solved by the Invention

Then, the inventors of the present invention conducted intensive studies to develop a solid fuel which can be used as an energy source capable of suppressing the production of carbon dioxide without substantially using plastics derived from oil by using waste wood and used paper which have been difficult to be recycled. As a result, they found that, when waste wood and used paper are broken into pieces of a predetermined size, the obtained pieces are mixed with predetermined small amounts of a binder, a form retaining agent and a caloric augmentation agent in place of plastics which may generate a harmful gas at the time of combustion such as incineration and have been used in the prior art, and the resulting mixture is molded, a solid having a certain shape and a certain size can be formed, and this solid has excellent form retention ability and a large calorific value as a fuel, rarely produces a harmful gas or a harmful residue, greatly serves to suppress the production of carbon dioxide as all the raw materials are derived from plants, and is useful as a solid fuel for mechanical power generation. Thus, according to the present invention, there can be provided a solid fuel which makes effective use of waste wood and used paper that have had no utility value and must be disposed by incineration as energy sources and can be used for power generation as a clean energy source.

Means for Solving the Problem

According to the present invention, there is provided the following solid fuel.

(1) A solid fuel which is formed from a mixture of wood pieces having a size of 1 to 50 mm (component A), paper pieces having a size of 1 to 50 mm (component B), a binder (component C-1), a form retaining agent (component C-2) and a caloric augmentation agent (component D), wherein the total amount of the components A and B is 15 to 45 parts by weight and the total amount of the components C-1, C-2 and D is 55 to 85 parts by weight based on 100 parts by weight of the mixture, the weight ratio of the component A to the component B is 20:80 to 80:20, and the mixture is compression molded.

(2) The solid fuel in the above paragraph (1), wherein the total amount of the components C-1 and C-2 is 25 to 60 parts by weight based on 100 parts by weight of the mixture.

(3) The solid fuel in the above paragraph (1), wherein the amount of the component D is 15 to 60 parts by weight based on 100 parts by weight of the mixture.

(4) The solid fuel in the above paragraph (1), wherein the weight ratio of the component C-1 to the component C-2 is 6:4 to 8:2.

(5) The solid fuel in the above paragraph (1), wherein the weight ratio of the component A to the component B is 25:75 to 75:25.

(6) The solid fuel in the above paragraph (1), wherein the binder (component C-1) is starch derived from sea alga.

(7) The solid fuel in the above paragraph (1), wherein the form retaining agent (component C-2) is natural rubber.

(8) The solid fuel in the above paragraph (1), wherein the caloric augmentation agent is a vegetable oil-containing substance.

(9) The solid fuel in the above paragraph (1) having an average size of 10 to 100 cm$^3$ each.

(10) The solid fuel in the above paragraph (1) which is prismatic or cylindrical in shape.

(11) The solid fuel in the above paragraph (1) having an apparent specific gravity of 0.3 to 0.6 g/cm$^3$.

(12) The solid fuel in the above paragraph (1) having a calorific value of 20 to 30 MJ/kg.

(13) The solid fuel in the above paragraph (1) which is used for thermal power generation.

Effect of the Invention

The solid fuel of the present invention can be effectively used as a new energy source, especially an energy source for power generation, by making use of waste wood, used paper, a binder, a form retaining agent and a caloric augmentation agent in a balanced manner. The solid fuel of the present invention can be a new type of solid fuel which makes use of wood and paper waste materials that have been disposed by incineration, rarely produces a harmful gas or a harmful residue, has a large calorific value and leads to the suppression of the production of carbon dioxide.

When waste wood and used paper are broken into small pieces having a specific size and the pieces are used in a certain proportion in the solid fuel of the present invention, the binder and the form retaining agent serve as binders, and the caloric augmentation agent effectively serves to secure a certain amount of heat, thereby making it possible to mold a solid fuel.

Since the solid fuel of the present invention uses a plant-derived binder, a form retaining agent and a caloric augmentation agent without substantially using plastics derived from oil, it has a remarkable effect of suppressing the production of carbon dioxide.

BEST MODE FOR CARRYING OUT THE INVENTION

The solid fuel of the present invention is a solid obtained by molding a mixture of wood pieces, paper pieces, a binder, a form retaining agent and a caloric augmentation agent, wherein waste products to be disposed of are used as the raw materials of the wood pieces and the paper pieces. A description is subsequently given of the ratio of the raw materials and a molding method.

(a) Wood Pieces

Waste wood collected by breaking down old furniture and buildings such as old houses, wood chips and end pieces from sawmills, thinned wood and used pallets are used as the raw materials of the wood pieces. The type of the wood is not particularly limited. When the above waste wood is dry, it is used as it is and when it contains water, it is dried and crushed. Wood chips collected from sawmills may be used as they are without being crushed when the sizes of the wood chips fall within the range which will be specified hereinafter.

The wood pieces obtained by crushing are desirably 1 to 50 mm in size. The term "size" as used herein means the maximum diameter of each wood piece. Stated more specifically, wood pieces passing through a sieve having an opening of 50 mm or less may be used as the raw materials. The preferred size is 1 to 25 mm. The shapes of the wood pieces are not particularly limited as long as they are crushed by a rotary crushing machine having teeth. The wood pieces are desirably dry but wood pieces having a water content of 20 wt % or less, preferably 15 wt % or less may be used without any problem.

(b) Paper Pieces

The raw materials of the paper pieces are not only used paper recycled as reclaimed paper, such as secondhand books, newspaper, cardboards and office paper but also coated paper and laminated paper which are hardly recycled as reclaimed paper. These paper raw materials are cut or severed to a size of 1 to 50 mm. The term "size" as used herein means the size of paper pieces passing through a sieve having an opening of 50 mm or less. The preferred size of the paper pieces is 1 to 25 mm. The paper pieces used as the raw materials are preferably dry but may contain water in an amount of 15 wt % or less, preferably 10 wt % or less.

(c-1) Binder

The binder is starch collected from sea alga containing alginic acid, as exemplified by agarose, carrageenan, curdlan and glucomannan. At least one dried binder out of these or a combination of a binder and a form retaining agent may be used. The binder is cut or severed to a size of 1 to 50 mm. The term "size" as used herein means the size of a binder passing through a sieve having an opening of 50 mm or less. The binder may be powdery.

(c-2) Form Retaining Agent

Natural rubber or a natural rubber-containing product is used as the form retaining agent. Examples thereof include guar gum, tara gum, locust bean gum, tamarind seed gum, psyllium seed gum, gum arabic, gellan gum, curdlan, pectin, cellulose, chitin, chitosan, xanthan gum, karaya gum, arabinogalactan, ghatti gum, tragacanth gum, furcellan, pullulan, aeromonas gum, agrobacterium succinoglycan, azotobacter vinelandii gum, linseed gum, almond gum, welan gum, erwinia mitsuensis gum, gum elemi, enterobacter gum, enterobacter simanus gum, oligoglucosamine, cassia gum, carob bean gum, glucosamine, artemisia sphaerocephala seed gum, sclero gum, sesbania gum, dextran, triacanthos gum, abelmoschus manihot, macrophomopsis gum, rhamsan gum, levan, daruman resin, peach gum and tamarind. At least one dried form retaining agent out of these or a combination of a form retaining agent and a binder may be used.

Out of these, guar gum, tara gum, locust bean gum, tamarind seed gum, psyllium seed gum, gellan gum, curdlan, xanthan gum, gum arabic, pectin, cellulose, chitin, chitosan, karaya gum and carob bean gum are preferred, and guar gum, tara gum, locust bean gum, tamarind seed gum, psyllium seed gum, gellan gum, curdlan and xanthan gum are most preferred.

The form retaining agent is cut or severed to a size of 1 to 50 mm. The term "size" as used herein means the size of a form retaining agent passing through a sieve having an opening of 50 mm or less. The form retaining agent may be powdery.

(d) Caloric Augmentation Agent

*Sapium sebiferum*, *Quercus suber*, millet, rice, food carbide, flax, jute, ramie, kenaf, *Abutilon avicennae*, roselle, Musa basjoo, *Juncus effuses* L. var. *decipens Buchen.*, *Cyperus monophyllus Vahl*, okra, *Morus bombycis*, banana, pineapple, *Agave Tequilana*, sarago, wisteria, linden, bamboo, reed, esparto, sabai grass, *Alpinia zerumbet, Hermerocallis aurantiaca*, raran grass, morochi grass, papyrus, ryusu grass, *Pueraria lobata, Edgeworthia chrysantha*, aotan, cashew nut, oat, lupine, calendula, coffee, hazelnut, spurge, pumpkin, coriander, mustard seed, *Carthamus tinctorius*, cacao, *Tenderstem broccoli, Brassica campestris*, macadamia nut, nuts, *Ricinus communis, Jatropha curcas*, palm, sugarcane, *Sorghum bicolor*, potato, wheat, *Oryza sativa*, olive, sunflower, soybean, safflower, peanut, willow, poplar, switchgrass, elephant grass, *Evodiopanax innovans*, cactus, lumber, sugar beet, *Pistacia chinesis Bunge*, cotton, copaiba, *Pongamia pinnata*, jojoba, *Euphorbia tirucalli, Zea mays*, sweet potato, *Sargassum fulvellum*, sesame, cardoon, avocado, kusabinoki, quinua, *Guizotia abyssinica*, hemp and paulownia all of which are vegetable oil-containing substances are used as the caloric augmentation agent. *Sapium sebiferum, Ricinus communis, Jatropha curcas*, palm, sugarcane, *Zea mays* and processed residues thereof are preferred and used as heat sources for burning the solid fuel as a fuel at a power generation facility. The term "processed residues" means press cakes obtained after oil is squeezed out of the fruits and seeds of *Sapium sebiferum, Quercus suber*, millet, rice, food carbide, flax, jute, ramie, kenaf, *Abutilon avicennae*, roselle, Musa basjoo, *Juncus effuses* L var. *decipens Buchen.*, *Cyperus monophyllus Vahl*, okra, *Morus bombycis*, banana, pineapple, *Agave Tequilana*, sarago, wisteria, linden, bamboo, reed, esparto, sabai grass, *Alpinia zerumbet, Hermerocallis aurantiaca*, raran grass, morochi grass, papyrus, ryusu grass, *Pueraria lobata, Edgeworthia chrysantha*, aotan, cashew nut, oat, lupine, calendula, coffee, hazelnut, spurge, pumpkin, coriander, mustard seed, *Carthamus tinctorius*, cacao, *Tenderstem broccoli, Brassica campestris*, macadamia nut, nuts, *Ricinus communis, Jatropha curcas*, palm, sugarcane, *Sorghum bicolor*, potato, wheat, *Oryza sativa*, olive, sunflower, soybean, safflower, peanut, willow, poplar, switchgrass, elephant grass, *Evodiopanax innovans*, cactus, lumber, sugar beet, *Pistacia chinesis Bunge*, cotton, copaiba, *Pongamia pinnata*, jojoba, *Euphorbia tirucalli, Zea mays*, sweet potato, *Sargassum fulvellum*, sesame, cardoon, avocado, kusabinoki, quinua, *Guizotia abyssinica*, hemp and paulownia. The fruit seeds of *Sapium sebiferum, Ricinus communis, Jatropha curcas*, palm, sugarcane and *Zea mays* or pulverized products thereof are preferred. Out of these, the fruit seeds of *Sapium sebiferum, Ricinus communis* and *Jatropha curcas* or pulverized products thereof are particularly preferred. These vegetable oil-containing substances are cut or severed to a size of 1 to 50 mm. The term "size" as used herein means the size of a vegetable oil-containing substance passing through a sieve having an opening of 50 mm or less. Although seeds are mainly used, branches or trunks may be partially mixed.

(e) Composition

The total amount of the wood pieces (component A) and the paper pieces (component B) is 15 to 45 parts by weight, preferably 20 to 40 parts by weight, and the total amount of the binder (component C-1), the form retaining agent (component C-2) and the caloric augmentation agent (component D) is 55 to 85 parts by weight, preferably 60 to 80 parts by weight based on 100 parts by weight of a mixture of all the components. The weight ratio of the component A to the component B is 20:80 to 80:20, preferably 25:75 to 75:25.

The total amount of the components C-1 and C-2 is 25 to 60 parts by weight, preferably 30 to 55 parts by weight, and the amount of the component D is 15 to 60 parts by weight, preferably 18 to 55 parts by weight based on 100 parts by weight of the mixture.

The weight ratio of the component C-1 to the component C-2 is 6:4 to 8:2, preferably 6.5 to 3.5 to 7.5 to 2.5. The weight ratio of the component A to the component B is 20:80 to 80:20, preferably 25:75 to 75:25.

Within the above ranges, the solid fuel of the present invention can be solidified by using relatively small amounts of the binder, the form retaining agent and the caloric augmentation agent, the balanced recycling of waste wood and used paper becomes possible, and the calorific value becomes stable. When the total amount of the wood pieces and the paper pieces is 15 to 45 parts by weight, the total amount of the binder, the form retaining agent and the caloric augmentation agent is 55 to 85 parts by weight. This ratio is changed by the desired calorific value of the solid fuel.

(f) Molding Method

A mixture of the above wood pieces, paper pieces, binder, form retaining agent and caloric augmentation agent in the above ratio is preferably pressurized and compressed such that they are closely dispersed.

A method in which the wood pieces and the paper pieces are pre-mixed together and the binder, the form retaining agent and the caloric augmentation agent are mixed with the resulting mixture is particularly preferred, and a single-screw or double-screw extruder may be used as a mixing machine. The use of a double-screw extruder is particularly desirable. A composition which has been compressed and extruded by the extruder is ejected from a prismatic or circular nozzle and cut to a suitable length to obtain a prismatic or cylindrical molded product.

A solid fuel having a desired size can be obtained by setting the diameter of the cylindrical nozzle to 5 to 50 mm and the cut length to 10 to 100 mm.

(g) Characteristic Properties of Solid Fuel

Since the solid fuel of the present invention is preferably manufactured by the above molding method industrially, the shape thereof is desirably cylindrical or prismatic and particularly advantageously cylindrical. The size of the solid fuel is each desirably 10 to 100 $cm^3$ on average in terms of volume. The apparent specific gravity of the solid fuel is desirably in the range of 0.3 to 0.6 $g/cm^3$.

The calorific value of the solid fuel is stable at 20 to 30 Mj/kg. Therefore, the solid fuel of the present invention comprises the waste wood, the used paper, the binder, the form retaining agent and the caloric augmentation agent in a balanced manner, has a highly stable calorific value and a great effect of suppressing the production of carbon dioxide and therefore is advantageously used as a fuel for thermal power generation.

EXAMPLES

The following examples are provided to further illustrate the present invention.

The following wood pieces, paper pieces, binder, form retaining agent and caloric augmentation agent were used in the following examples.

(a) Wood Pieces (Component A)

The wood pieces (size of 25 mm or less) were obtained by crushing waste wood such as waste wood obtained from construction materials and end pieces obtained by sawing lumber.

(b) Paper Pieces (Component B)

The paper pieces (size of 25 mm or less) were obtained by crushing package paper waste and paper waste having a protective film.

(c) Binder (Component C-1), Form Retaining Agent (Component C-2)

The binder (component C-1) was obtained by crushing dried sea alga to a size of 25 mm or less (agarose).

Guar gum powders were used as the form retaining agent (component C-2).

(d) Caloric Augmentation Agent (Component D)

A seed collected from the cultivated *Ricinus communis* and a crushed product thereof.

Example 1

15 parts by weight of the component C-1, 10 parts by weight of the component C-2 and 55 parts by weight of the component D were mixed with a mixture of 5 parts by weight of the component A and 15 parts by weight of the component B, and the resulting mixture was extruded by a double-screw extruder to obtain a cylindrical solid fuel having a diameter of about 35 mm (length of 50 mm). The apparent specific gravity (bulk specific gravity), calorific value, chlorine content and form retention stability tested by the following method of this solid fuel are shown in Table 1 below.

Example 2

20 parts by weight of the component C-1, 5 parts by weight of the component C-2 and 55 parts by weight of the component D were mixed with a mixture of 15 parts by weight of the component A and 5 parts by weight of the component B, and the resulting mixture was extruded by a double-screw extruder to obtain a cylindrical solid fuel having a diameter of about 35 mm (length of 50 mm). The apparent specific gravity (bulk specific gravity), calorific value, chlorine content and form retention stability of this solid fuel are shown in Table 1 below.

Example 3

28 parts by weight of the component C-1, 7 parts by weight of the component C-2 and 25 parts by weight of the component D were mixed with a mixture of 10 parts by weight of the component A and 30 parts by weight of the component B, and the resulting mixture was extruded by a double-screw extruder to obtain a cylindrical solid fuel having a diameter of about 35 mm (length of 50 mm). The apparent specific gravity (bulk specific gravity), calorific value, chlorine content and form retention stability of this solid fuel are shown in Table 1 below.

Example 4

24 parts by weight of the component C-1, 16 parts by weight of the component C-2 and 20 parts by weight of the component D were mixed with a mixture of 30 parts by weight of the component A and 10 parts by weight of the component B, and the resulting mixture was extruded by a double-screw extruder to obtain a cylindrical solid fuel having a diameter of about 35 mm (length of 50 mm). The apparent specific gravity (bulk specific gravity), calorific value, chlorine content and form retention stability of this solid fuel are shown in Table 1 below.

TABLE 1

| | | Product: solid fuel | | | | |
| --- | --- | --- | --- | --- | --- | --- |
| | | Size | bulk specific gravity | Calorific value | | Chlorine | Form retention |
| | Type of product | (length) mm | g/cm$^2$ | Joule (MJ/Kg) | Calorie (cal/g) | content % | stability |
| Ex. 1 | Solid (sample (1)) | 50 | 0.47 | 27.67 | 6610 | 0.078 | satisfactory |
| Ex. 2 | Solid (sample (2)) | 50 | 0.41 | 28.22 | 6740 | 0.088 | satisfactory |
| Ex. 3 | Solid (sample (3)) | 50 | 0.42 | 26.42 | 6310 | 0.068 | satisfactory |
| Ex. 4 | Solid (sample (4)) | 50 | 0.48 | 26.29 | 6280 | 0.153 | satisfactory |

<Form Retention Stability Test on Solid Fuel>

The form retention stability of each of the above samples (1) to (4) was checked. The expression "weight ratio of pieces" means the ratio of the total weight of pieces having a size of about 10 cm$^3$ or less obtained by sieving the solid fuel to the weight of the solid fuel before sieving.

The form retention stability was checked by loading 500 kg of the solid fuel after molding into a transport vehicle from a storage installation twice by using a reach loader.

The evaluation results are as follows.

Sample (1): The solid fuel has a good molded state and retains a certain shape and a certain size even at the time of delivery to a storage installation and loading into a transport vehicle (weight ratio of pieces: 3%)

Sample (2): The solid fuel has a good molded state and retains a certain shape and a certain size even at the time of delivery to a storage installation (weight ratio of pieces: 5%)

Sample (3): The solid fuel has a good molded state and retains a certain shape and a certain size even at the time of delivery to a storage installation (weight ratio of pieces: 2%)

Sample (4): The solid fuel has a good molded state and retains a certain shape and a certain size even at the time of delivery to a storage installation (weight ratio of pieces: 4%)

(Evaluation: Weight Ratio % of Pieces)

0 to 5%: good 6 to 10%: moderate 11 to 15%: bad

What is claimed is:

1. A solid fuel which is formed from a mixture of wood pieces having a size of 1 to 50 mm (component A), paper pieces having a size of 1 to 50 mm (component B), a binder (component C-1), a form retaining agent (component C-2) and a caloric augmentation agent (component D), wherein the total amount of the components A and B is 15 to 45 parts by weight and the total amount of the components C-1, C-2 and D is 55 to 85 parts by weight based on 100 parts by weight of the mixture, the weight ratio of the component A to the component B is 20:80 to 80:20, and the mixture is compression molded, the binder (component C-1) comprises starch derived from sea alga; the form retaining agent (component C-2) comprises natural rubber; and the caloric augmentation agent (component D) comprises a vegetable oil-containing substance selected from the fruit seeds of *Sapium sebiferum, Ricinus communis* and *Jatropha curcas* or pulverized product thereof.

2. The solid fuel according to claim 1, wherein the total amount of the components C-1 and C-2 is 25 to 60 parts by weight based on 100 parts by weight of the mixture.

3. The solid fuel according to claim 1, wherein the amount of the component D is 15 to 60 parts by weight based on 100 parts by weight of the mixture.

4. The solid fuel according to claim 1, wherein the weight ratio of the component C-1 to the component C-2 is 6:4 to 8:2.

5. The solid fuel according to claim 1, wherein the weight ratio of the component A to the component B is 25:75 to 75:25.

6. The solid fuel according to claim 1 having an average size of 10 to 100 cm$^3$ each.

7. The solid fuel according to claim 1 which is prismatic or cylindrical in shape.

8. The solid fuel according to claim 1 having a bulk specific gravity of 0.3 to 0.6 g/cm$^3$.

9. The solid fuel according to claim 1 having a calorific value of 20 to 30 MJ/kg.

10. The solid fuel according to claim 1 which configured for thermal power generation.

\* \* \* \* \*